United States Patent [19]

Thomson

[11] Patent Number: 4,471,719
[45] Date of Patent: Sep. 18, 1984

[54] ANIMAL FARROWING STALL WITH SIBLING PROTECTOR

[75] Inventor: Carter Thomson, Grinnell, Iowa

[73] Assignee: Ahrens Agricultural Industries Co., Grinnell, Iowa

[21] Appl. No.: 381,933

[22] Filed: May 26, 1982

[51] Int. Cl.³ .............................................. A01K 1/02
[52] U.S. Cl. ........................................ 119/16; 119/20
[58] Field of Search ............................. 119/20, 27, 16

[56] References Cited

U.S. PATENT DOCUMENTS

| | | | |
|---|---|---|---|
| 3,084,668 | 4/1963 | McMurray et al. | 119/20 |
| 3,106,188 | 10/1963 | McMurray | 119/20 |
| 3,785,346 | 1/1974 | Dower | 119/27 |
| 4,269,144 | 5/1981 | Ahrens | 119/16 |

Primary Examiner—Hugh R. Chamblee
Attorney, Agent, or Firm—Zarley, McKee, Thomte, Voorhees & Sease

[57] ABSTRACT

A farrowing stall having sidewalls and end walls includes a U-shaped downwardly and inwardly facing member pivotally connected to the stall sidewalls for being pivoted between a raised vertical position to a downwardly horizontal position for limiting movement of the animal towards the adjacent end wall. A chain suspended from the top of the stall limits downward pivoting to a horizontal position.

1 Claim, 4 Drawing Figures

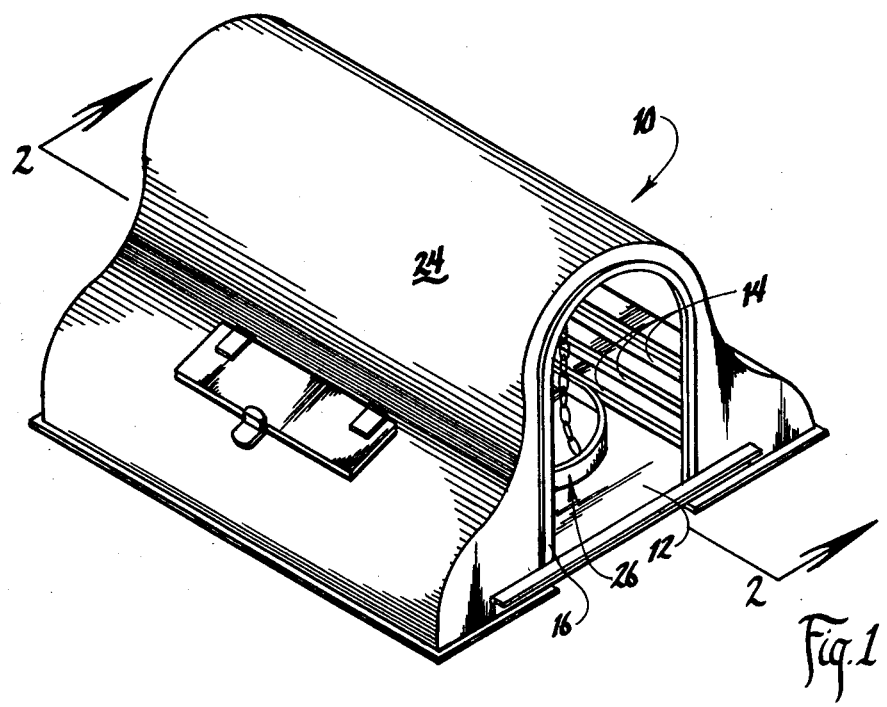
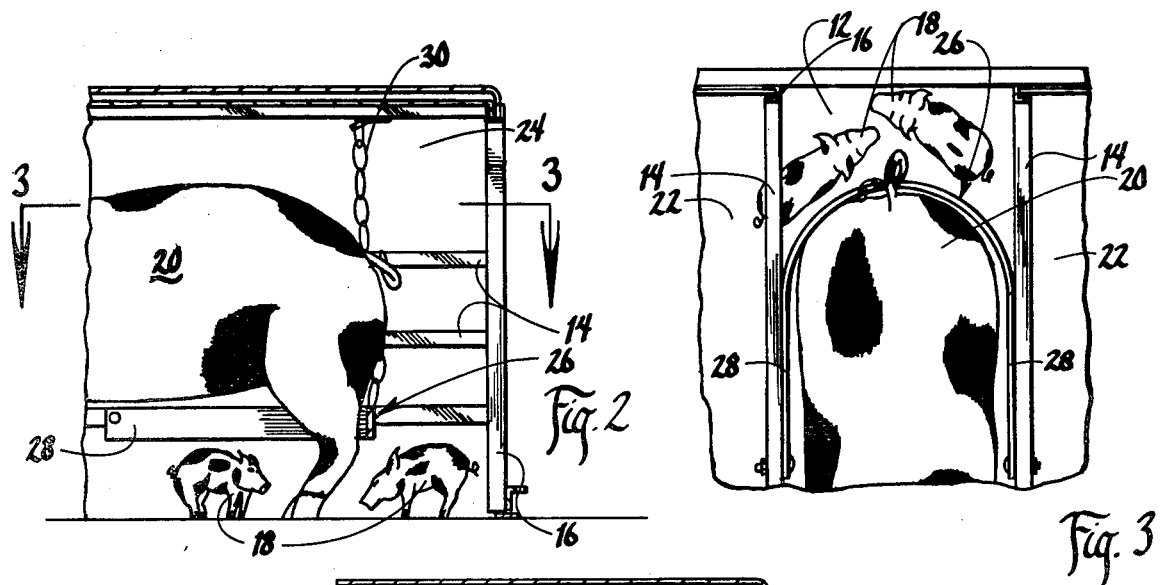
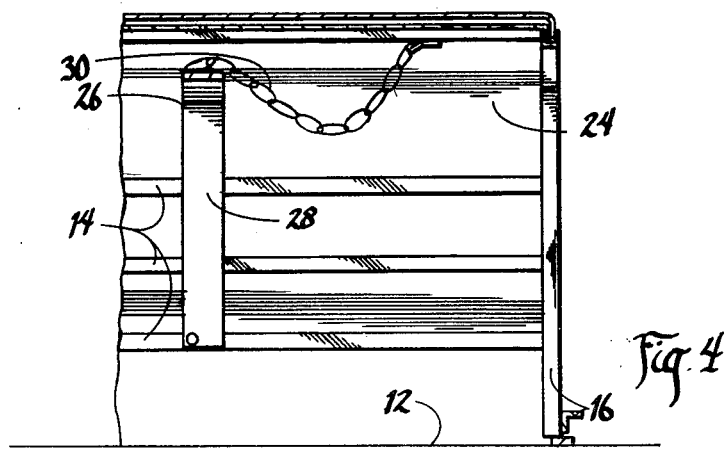

ANIMAL FARROWING STALL WITH SIBLING PROTECTOR

BACKGROUND OF THE INVENTION

A typical farrowing stall for a sow and pigs includes a passageway formed by oppositely disposed sidewalls and end walls. The pigs may move freely under the sidewalls to the center passageway for nursing. The pigs enjoy protection from the mother lying on them when they are in either of the side areas. A problem however exists when the sow backs up against the end wall since the pigs may be mashed. Accordingly, a protection system for the pigs is needed that will protect the pigs from being mashed when the mother moves lengthwise of the center passageway and particularly moves backwardly against the adjacent end wall.

SUMMARY OF THE INVENTION

The farrowing stall of this invention includes a protector system for preventing injuries to the pigs when the mother sow moves rearwardly in the center passageway. This is accomplished by providing a downwardly and inwardly facing U-shaped member pivotally connected at the opposite ends of the legs to the opposite sidewalls of the center passageway. A chain allows the U-shaped member to pivot to a horizontal plane such that the U-shaped member is directly behind the sow and if she moves rearwardly she will press against the concave member which conforms to her body contour. The U-shaped member is spaced from the adjacent end walls such that a space is provided for the pigs between the rear of the sow and the end wall of the center passageway.

When the U-shaped member is in its raised position it is out of the way over the sow and at the top of the passageway.

DESCRIPTION OF THE DRAWINGS

FIG. 1 is a perspective view of the farrowing hut of this invention;

FIG. 2 is a fragmentary side elevational cross-sectional view taken along line 2—2 in FIG. 1;

FIG. 3 is a cross-sectional view taken along line 3—3 in FIG. 2; and

FIG. 4 is a view similar to FIG. 2 but showing the U-shaped stop member in its raised out-of-use position.

DESCRIPTION OF THE PREFERRED EMBODIMENT

The farrowing hut of this invention is referred to generally in FIG. 1 by the reference numeral 10 and includes a center passageway 12 formed by oppositely disposed sidewalls 14 and end walls 16.

Pigs 18 and a mother sow 20 are shown in the center passageway 12 in FIG. 3 with the pigs being free to move under the sidewalls 14 into side pig compartments 22. The end walls 16 include doors not shown for closing the openings at opposite ends of the passageway 12.

The farrowing hut 10 includes an exterior roof 24 which extends over the passageway 12 and over the pig compartments 22.

The sow 20 is limited in moving towards the adjacent end walls 16 as shown in FIGS. 2 and 3 by a stop member 26. The stop member 26 is U-shaped and includes side legs 28 pivotally connected to the lower area of the sidewalls 14 for pivotal movement between a lowered use position wherein it is horizontally disposed as seen in FIG. 2 to a raised vertical storage position as seen in FIG. 4. The mid or center bight portion when the stop member 26 is lowered is spaced sufficiently from the adjacent end wall 16 to provide an area for the pigs 18 to move about without being mashed by the mother sow 20. A chain 30 is suspended from the roof 24 centrally thereof and engages the center bight portion of the U-shaped stop member 26. The chain has a length such that when it is fully extended the U-shaped member is in its horizontal lowered position as seen in FIG. 2. The chain also limits the U-shaped member from pivoting substantially past a vertical raised position in the opposite direction.

In use the sow 20 would be admitted to the center passageway 12 by raising the stop member 26 to the position of FIG. 4 and then after pigs are delivered the stop member 26 would be lowered to its use position of FIG. 2 thereby not only giving the pigs freedom to move into the side compartments 14 but also behind the sow between the rear end and the adjacent end wall.

I claim:

1. A swine farrowing hut, comprising:

a hut structure including a floor, oppositely disposed fixed sidewalls defining a central sow section, oppositely disposed side offspring sections flanking said sow section, opposite end walls, and a roof enclosing said structure, a U-shaped sow stop member of continuous single-piece construction positioned in said sow section and being pivotally mounted at its opposite ends to the adjacent oppositely disposed sidewalls of said sow section such that said member is pivotable between a raised storage position and a lowered use position adjacent to but spaced from one of said end walls and the floor whereby offspring are free to move about in said sow section without said sow pressing the offspring against said adjacent end wall by said sow being limited in moving towards said adjacent end wall by said stop member, and a chain having one end connected to said U-shaped stop member midway between said ends of said stop member and a second end connected to the center of said roof adjacent to but spaced from said one end wall thereby limiting downward pivoting of said stop member to a horizontal position whereby said chain is substantially in a vertical plane and offers maximum resistance to a downward force on said stop member and substantially free and clear of said sow when said stop member is in said lowered position, said stop member being U-shaped downwardly when in said raised position and U-shaped inwardly when in said lowered position, said stop member being horizontally disposed in said lowered position, said stop member being positioned substantially below the midpoint of the height of said structure when in said lower position so as to engage the lower half of the body of said sow thereby preventing said sow from moving said stop member upwardly away from said lowered position and being shaped to substantially conform to the rear end of said sow pressing thereagainst, said chain and said stop member cooperating to prevent said sow from exerting downward force on said stop member by sitting thereon and stepping over said stop member when said stop member is in said lowered position.

* * * * *